(12) United States Patent　　(10) Patent No.: US 8,281,110 B2
McDonald et al.　　(45) Date of Patent: Oct. 2, 2012

(54) OUT-OF-ORDER MICROPROCESSOR WITH SEPARATE BRANCH INFORMATION CIRCULAR QUEUE TABLE TAGGED BY BRANCH INSTRUCTIONS IN REORDER BUFFER TO REDUCE UNNECESSARY SPACE IN BUFFER

(75) Inventors: Thomas C. McDonald, Austin, TX (US); Brent Bean, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 502 days.

(21) Appl. No.: 12/581,000

(22) Filed: Oct. 16, 2009

(65) Prior Publication Data

US 2011/0016292 A1　Jan. 20, 2011

Related U.S. Application Data

(60) Provisional application No. 61/225,828, filed on Jul. 15, 2009.

(51) Int. Cl.
　　*G06F 9/38*　　(2006.01)

(52) U.S. Cl. .... 712/219; 712/233; 712/239; 712/E9.045
(58) Field of Classification Search ................. None
　　See application file for complete search history.

(56) References Cited

U.S. PATENT DOCUMENTS 5,574,871 A * 11/1996 Hoyt et al. ............... 712/200
* cited by examiner

*Primary Examiner* — Kenneth Kim
(74) *Attorney, Agent, or Firm* — E. Alan Davis; James W. Huffman

(57) ABSTRACT

An out-of-order execution in-order retire microprocessor includes a branch information table comprising N entries. Each of the N entries stores information associated with a branch instruction. The microprocessor also includes a reorder buffer comprising M entries. Each of the M entries stores information associated with an unretired instruction within the microprocessor. Each of the M entries includes a field that indicates whether the unretired instruction is a branch instruction and, if so, a tag identifying one of the N entries in the branch information table storing information associated with the branch instruction. N is significantly less than M such that the overall die space and power consumption is reduced over a processor in which each reorder buffer entry stores the branch information.

26 Claims, 3 Drawing Sheets

*Fig. 2*

BIT entry

107

| predicted target address (48 bits) 202 |
|---|
| global branch pattern (40 bits) 204 |
| fetch address (32 bits) 206 |
| return stack pointers/valids (20 bits) 208 |
| BTAC way hit/valids (8 bits) 212 |
| branch type bits (10 bits) 214 |
| performance tracking bits 216 |

*Fig. 3*

ROB entry

117

| normal instruction information 302 |
|---|
| branch flag 304 |
| branch taken flag 306 |
| BIT tag 308 |

OUT-OF-ORDER MICROPROCESSOR WITH SEPARATE BRANCH INFORMATION CIRCULAR QUEUE TABLE TAGGED BY BRANCH INSTRUCTIONS IN REORDER BUFFER TO REDUCE UNNECESSARY SPACE IN BUFFER

CROSS REFERENCE TO RELATED APPLICATION(S)

This application claims priority based on U.S. Provisional Application Ser. No. 61/225,828, filed Jul. 15, 2009, entitled OUT-OF-ORDER EXECUTION IN-ORDER RETIRE MICROPROCESSOR WITH BRANCH INFORMATION TABLE TO ENJOY REDUCED REORDER BUFFER SIZE, which is hereby incorporated by reference in its entirety.

FIELD OF THE INVENTION

The present invention relates in general to the field of microprocessors, and particularly to branch prediction within an out-of-order execution microprocessor.

BACKGROUND OF THE INVENTION

The architectural specification of many microprocessors (for example x86 architecture microprocessors) requires instructions to write their results to architecturally visible state in program order (commonly referred to as in-order retirement). Nevertheless, the microarchitecture of many modern in-order retire microprocessors execute (i.e., generate instruction results) out of program order (commonly referred to as out-of-order execution). These microprocessors commonly employ a hardware structure referred to as a reorder buffer (ROB), or some similar structure, to accomplish in-order retirement in the presence of out-of-order execution.

The ROB stores information about each unretired instruction within the processor. An unretired instruction is an instruction that has been fetched, decoded, and either executed (i.e., execution units have generated its result) or waiting to be issued for execution, but its results have not yet been written to architectural state. In particular, the ROB stores information that identifies the program order of the unretired instructions relative to one another. Additionally, the ROB stores a great deal of other information about each unretired instruction.

All microprocessors include in their instruction sets branch instructions. Generally, a processor fetches instructions sequentially. However, a branch instruction instructs the processor to begin fetching instructions from a non-sequential location. Because instructions are fetched at the top of a microprocessor pipeline but executed (i.e., the branch direction and target address outcome is determined) near the bottom of the pipeline, the presence of branch instructions may result in pipeline bubbles that causes poor utilization of microprocessor resources and increased clocks per instruction (CPI), as is well-known in the art of microprocessor design.

To overcome this problem, modern microprocessors include branch predictors that predict the presence and outcome of branch instructions as they are fetched. Branch prediction is also well-known in the art of microprocessor design. However, a relatively large amount of information must be retained for the branch instruction as it is processed by the pipeline. In particular, information must be retained for the purpose of correcting a misprediction of a branch instruction and for updating the branch history information in the branch predictors to enable them to make more accurate predictions of future executions of the branch instruction. The number of bits of branch information associated with each branch instruction that must be stored can be on the order of 200 bits. Furthermore, the number of ROB entries that must store these bits can be significant, and as the execution resources of the microprocessor increases, the number of entries of the ROB will likely also need to increase significantly to fully utilize the execution resources. Thus, the storage for the branch information bits makes the ROB very large in terms of die area and power consumption.

BRIEF SUMMARY OF INVENTION

In one aspect the present invention provides an out-of-order execution in-order retire microprocessor. The microprocessor includes a branch information table comprising N entries. Each of the N entries is configured to store information associated with a branch instruction. The microprocessor also includes a reorder buffer, coupled to the branch information table, comprising M entries. Each of the M entries is configured to store information associated with an unretired instruction within the microprocessor. Each of the M entries includes a field that indicates whether the unretired instruction is a branch instruction and, if so, a tag identifying one of the N entries in the branch information table storing information associated with the branch instruction. N is less than M.

In another aspect, the present invention provides a method for storing information associated with branch instructions in out-of-order execution in-order retire microprocessor. The method includes storing information associated with a plurality of branch instructions in a branch information table. The branch information table comprises N entries. Each of the N entries is configured to store the information associated with a branch instruction. The method also includes storing information associated with an unretired instruction within the microprocessor in a reorder buffer. The reorder buffer comprises M entries. Each of the M entries includes a field that indicates whether the unretired instruction is a branch instruction and, if so, a tag identifying one of the N entries in the branch information table storing information associated with the branch instruction. N is less than M.

In yet another aspect, the present invention provides a computer program product for use with a computing device, the computer program product comprising a computer usable storage medium having computer readable program code embodied in the medium for specifying an out-of-order execution in-order retire microprocessor. The computer readable program code includes first program code for specifying a branch information table, comprising N entries, each of the N entries configured to store information associated with a branch instruction. The computer readable program code also includes second program code for specifying a reorder buffer, coupled to the branch information table, comprising M entries, each of the M entries configured to store information associated with an unretired instruction within the microprocessor. Each of the M entries includes a field that indicates whether the unretired instruction is a branch instruction and, if so, a tag identifying one of the N entries in the branch information table storing information associated with the branch instruction. N is less than M.

BRIEF DESCRIPTION OF THE DRAWINGS

FIG. 2 is a block diagram illustrating the contents of an entry in the branch information table according to an embodiment of the present invention.

FIG. 3 is a block diagram illustrating the contents of an entry in the reorder buffer according to an embodiment of the present invention.

DETAILED DESCRIPTION OF THE INVENTION

It is well-known that branch instructions typically account for only somewhere between 15 to 25% of program instructions. The present inventors have observed that consequently, for most program instruction mixes, the branch information storage is unused for most of the ROB entries. As a solution, embodiments are described herein that employ a separate structure—the branch information table—that stores the branch information, i.e., the information that is unique to branch instructions. Advantageously, the branch information table can have significantly fewer entries than the ROB. In one embodiment, the size of the ROB is 48 entries and the size of the branch information table is 16 entries. The branch information table is indexed by a tag. Each ROB entries has a field that indicates whether the instruction associated with the entry is a branch instruction and a field that stores the tag of the branch information table entry for that branch instruction.

Figure 1:
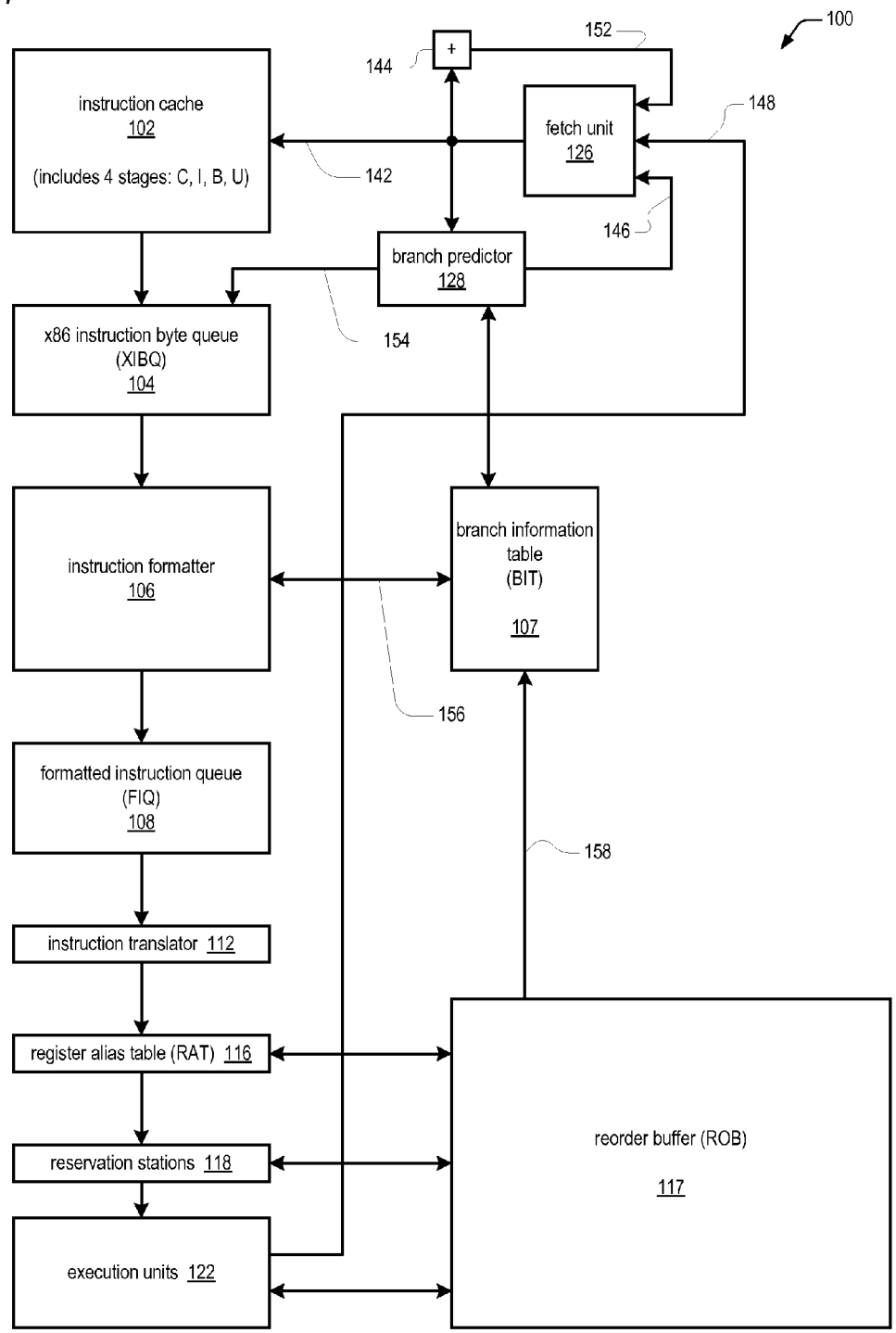
FIG. 1 is a block diagram illustrating a microprocessor according to the present invention.

Referring now to FIG. 1, a block diagram illustrating a microprocessor 100 according to the present invention is shown. The microprocessor 100 includes a pipeline of stages or functional units, including an instruction cache 102, an x86 instruction byte queue (XIBQ) 104, an instruction formatter 106, a formatted instruction queue 108, an instruction translator 112, a register alias table 116, reservation stations 118, and execution units 122. The microprocessor 100 also includes a fetch unit 126 that provides a fetch address 142 to the instruction cache 102 to select a cache line of instruction bytes 132 that are provided to the XIBQ 104. The microprocessor 100 also includes an adder 144 that increments the current fetch address 142 to generate a next sequential fetch address 152 that is provided back to the fetch unit 126. The fetch unit 126 also receives a predicted target address 146 from a branch predictor 128. Finally, the fetch unit 126 receives an executed target address 148 from the execution units 122.

The branch predictor 128 provides branch information 154 to the XIBQ 104. Among other things, the branch information 154 indicates whether or not the branch predictor 128 predicted that there is a branch instruction that will be taken present in the line of instruction bytes provided to the XIBQ 104 from the instruction cache 102; if the branch information 154 indicates taken, the fetch unit 126 selects the target address 146 provided by the branch predictor 128. In addition to the T/NT prediction indicator, in one embodiment, the branch information 154 includes the predicted target address 146, a global branch pattern that was used to make the prediction (such as is used in a gshare predictor, for example), the fetch address 142 of the cache line that was used by the branch predictor 128 to make the prediction, return stack pointers and valid bits, and various bits provided by a branch target address cache (BTAC) of the branch predictor 128, including way hit/valid bits and branch type bits (e.g., conditional branch, unconditional branch, return, call).

The XIBQ 104 is a queue of entries, each of which holds bytes of data from the instruction cache 102. Generally, the instruction formatter 106 may be considered an instruction decoder. In one embodiment, the microprocessor 100 is an x86 architecture microprocessor, whose instruction set includes variable length instructions. The instruction formatter 106 examines the stream of instruction bytes fetched from the XIBQ 104 and determines the beginning and ending byte of each instruction within the stream and thereby breaks up the stream of bytes into a stream of x86 instructions, which is provided to and stored in the formatted instruction queue 126 for processing by the remainder of the microprocessor 100 pipeline. The instruction translator 112 translates macroinstructions, such as x86 branch instructions, into the constituent microinstructions that implement the macroinstructions. In one embodiment, the instruction translator 112 translates each branch macroinstruction into one branch microinstruction.

The microprocessor 100 also includes a reorder buffer (ROB) 117 coupled to the RAT 116, reservation stations 118, and execution units 122. The microprocessor 100 also includes a branch information table (BIT) 107 coupled to the instruction formatter 106, ROB 117, and branch predictor 128. The ROB 117 is a circular queue of entries (shown in detail in FIG. 3) that are allocated in program order by the RAT 116 for microinstructions generated by the instruction translator 112. The BIT 107 is a circular queue of entries (shown in detail in FIG. 2) that are allocated in program order by the instruction formatter 106 for branch instructions encountered by the instruction formatter 106. The contents and operation of the ROB 117 and BIT 107 are discussed in more detail below with respect to the remaining Figures.

Referring now to FIG. 2, a block diagram illustrating the contents of an entry in the BIT 107 according to an embodiment of the present invention is shown. Each entry includes a 48-bit predicted target address field 202; a 40-bit global branch pattern field 204; a 32-bit fetch address field 206; a 20-bit return stack pointers/valids field 208; an 8-bit BTAC way hit/valids field 212; a 10-bit branch type field 214; and performance tracking bits 216. In one embodiment, the amount of storage in each BIT 107 entry is approximately 170 bits.

Referring now to FIG. 3, a block diagram illustrating the contents of an entry in the ROB 117 according to an embodiment of the present invention is shown. Each entry includes a field 302 for storing the normal instruction information that is stored for each instruction, regardless of whether the instruction is a branch instruction, which may include the instruction result and the status of the instruction for which the entry was allocated, which may be updated as the instruction is processed by the various pipeline stages, including exception information. Each entry also includes a branch flag 304 that is true if the instruction is a branch instruction. Each entry also includes a branch taken flag 306 that is true if the branch predictor 128 predicted that the branch instruction is taken. Finally, each entry includes a BIT tag field 308 that stores the tag that is an index into the BIT 107 to indicate the BIT 107 entry holding the branch information associated with the branch instruction.

Figure 4:
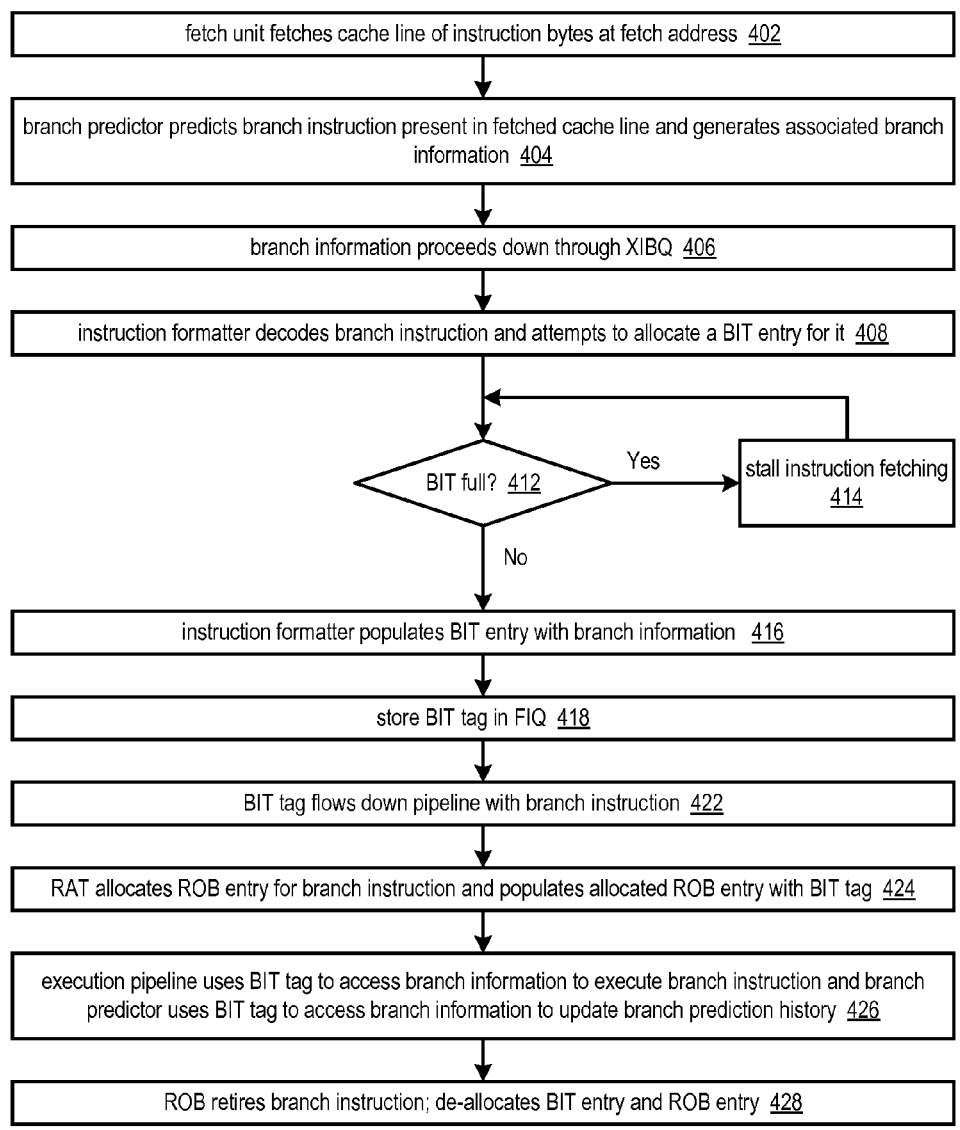
FIG. 4 is a flowchart illustrating operation of the microprocessor of FIG. 1 according to the present invention.

Referring now to FIG. 4, a flowchart illustrating operation of the microprocessor 100 of FIG. 1 according to the present invention is shown. Flow begins at block 402.

At block 402, the fetch unit 126 fetches a cache line of instruction bytes from the instruction cache 102 at the fetch address 142. Flow proceeds to block 404.

At block 404, the branch predictor 128 predicts that a branch instruction is present in the fetched cache line and generates the associated branch information 154. Flow proceeds to block 406.

At block 406, the generated branch information proceeds down through the XIBQ 104 to the instruction formatter 106. Flow proceeds to block 408.

At block 408, the instruction formatter 106 decodes the branch instruction and attempts to allocate an entry in the BIT 107 for the branch instruction. Flow proceeds to decision block 412.

At decision block 412, the instruction formatter 106 determines whether the BIT 107 is full, i.e., whether it was able to allocate a BIT 107 entry. If the BIT 107 is full, flow proceeds to block 414; otherwise, flow proceeds to block 416.

At block 414, the instruction formatter 106 asserts a signal to stall the instruction fetch pipeline above the instruction formatter 106, and flow returns to decision block 412 until the BIT 107 is no longer full.

At block 416, the instruction formatter 106 populates the allocated BIT 107 entry with the branch information associated with the branch instruction. Flow proceeds to block 418.

At block 418, the instruction formatter 106 stores the BIT 107 tag of the allocated BIT 107 entry into the formatted instruction queue 126 along with the branch instruction. Flow proceeds to block 422.

At block 422, the BIT 107 tag proceeds down the pipeline with the branch instruction until it reaches the RAT 116. Flow proceeds to block 424.

At block 424, the RAT 116 allocates an entry in the ROB 117 for the branch instruction and populates the allocated ROB 117 entry with the BIT 107 tag. Flow proceeds to block 426.

At block 426, the execution pipeline uses the BIT 107 tag to access the branch information in the BIT 107 entry to execute the branch instruction. Specifically, the execution unit 122 compares the predicted target address 202 with the actual/correct target address it calculates to determine whether a misprediction occurred. In the case of a conditional branch instruction, the execution unit 122 compares the predicted branch taken flag 306 in the ROB 117 entry with the actual/correct direction it calculates from the condition code flags to determine whether a misprediction occurred. Additionally, the execution pipeline notifies the branch predictor 128 that the branch instruction has been executed, and the branch predictor 128 responsively uses the BIT 107 tag to access the other branch information in the BIT 107 entry to update branch history information. Additionally, the microprocessor 100 may update the branch information as necessary, such as the performance tracking bits 216. Flow proceeds to block 428.

At block 428, the ROB 117 retires the branch instruction, deallocates the BIT 107 entry, and deallocates the ROB 117 entry. Flow ends at block 428.

As may be observed from the forgoing, the BIT 107 advantageously potentially provides a significant benefit in terms of smaller die size and lower power consumption over a conventional design that includes storage for the branch information within each ROB 117 entry. The benefits are obtained as a tradeoff for potentially lower performance of programs having an atypically high concentration of branch instructions, i.e., more than 16 within a 48 instruction grouping. This is because some pipeline bubbles may be experienced due to the lack of availability of a branch information table entry 107.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An out-of-order execution in-order retire microprocessor, comprising:
   a branch predictor, configured to predict the presence of branch instructions fetched from an instruction cache and to generate information associated with the branch instructions;
   an instruction decoder, configured to decode the fetched branch instructions;
   a branch information table, comprising a circular queue N entries allocated in program order in response to the instruction decoder decoding the branch instructions, each of the N entries configured to store the information generated by the branch predictor associated with one of the branch instructions, wherein the allocated entry is de-allocated after execution of the branch instruction; and
   a reorder buffer, coupled to the branch information table, comprising M entries, each of the M entries configured to store information associated with an unretired instruction within the microprocessor, wherein each of the M entries includes a field that indicates whether the unretired instruction is a branch instruction and, if so, a tag identifying one of the N entries in the branch information table storing the information associated with the branch instruction;
   wherein N is less than M.

2. The microprocessor of claim 1, wherein the branch predictor is further configured to update branch prediction information of the branch predictor based on the branch information stored in the branch information table.

3. The microprocessor of claim 1, further comprising:
   an execution unit, configured to execute a branch instruction using the branch information stored in the branch information table associated with the branch instruction, wherein the information associated with the branch instruction stored in each of the N entries of the branch information table comprises a predicted target address of the branch instruction, wherein to execute the branch instruction the execution unit obtains the predicted target address using the tag from the reorder buffer entry associated with the branch instruction an compares the predicted target address with a correct target address to determine whether branch predictor mispredicted the target address of the branch instruction.

4. The microprocessor of claim 1, wherein the information associated with the branch instruction stored in each of the N entries of the branch information table comprises at least one hundred bits.

5. The microprocessor of claim 1, further comprising:
a register alias table (RAT), configured to allocate one of the M entries of the reorder buffer and to populate the tag of the allocated one of the M entries to identify the one of the N entries of the branch information table allocated by the instruction decoder for the branch instruction.

6. The microprocessor of claim 1, wherein the instruction decoder is configured to stall instruction fetching in response to failing to allocate one of the N entries of the branch information table.

7. The microprocessor of claim 1, wherein N is less than approximately half of M.

8. The microprocessor of claim 1, wherein the information associated with the branch instruction stored in each of the N entries of the branch information table comprises a predicted target address of the branch instruction.

9. The microprocessor of claim 1, wherein the information associated with the branch instruction stored in each of the N entries of the branch information table comprises a global branch pattern used in a gshare predictor.

10. The microprocessor of claim 1, wherein the information associated with the branch instruction stored in each of the N entries of the branch information table comprises a fetch address from which the branch instruction was fetched.

11. The microprocessor of claim 1, wherein the information associated with the branch instruction stored in each of the N entries of the branch information table comprises pointers to a return stack of the microprocessor.

12. The microprocessor of claim 1, wherein the information associated with the branch instruction stored in each of the N entries of the branch information table comprises indications of whether a fetch address from which the branch instruction was fetched hit in a branch target address cache of the microprocessor.

13. The microprocessor of claim 1, wherein the information associated with the branch instruction stored in each of the N entries of the branch information table comprises information specifying a type of the branch instruction.

14. The microprocessor of claim 1, wherein the information associated with the branch instruction stored in each of the N entries of the branch information table comprises information for performance tracking of the branch instruction.

15. The microprocessor of claim 1, wherein each of the M entries includes a field that indicates whether the branch instruction was taken.

16. A computer program product for use with a computing device, the computer program product comprising:
a computer usable storage medium, having computer readable program code embodied in said medium, for specifying an out-of-order execution in-order retire microprocessor, the computer readable program code comprising:
first program code for specifying a branch predictor, configured to predict the presence of branch instructions fetched from an instruction cache and to generate information associated with the branch instructions;
second program code specifying an instruction decoder, configured to decode the fetched branch instructions;
third program code for specifying a branch information table, comprising a circular queue of N entries allocated in program order in response to the instruction decoder decoding the branch instructions, each of the N entries configured to store the information generated by the branch predictor associated with one of the branch instructions, wherein the allocated entry is de-allocated after execution of the branch instruction; and
fourth program code for specifying a reorder buffer, coupled to the branch information table, comprising M entries, each of the M entries configured to store information associated with an unretired instruction within the microprocessor, wherein each of the M entries includes a field that indicates whether the unretired instruction is a branch instruction and, if so, a tag identifying one of the N entries in the branch information table storing the information associated with the branch instruction;
wherein N is less than M.

17. A method for storing information associated with branch instructions in out-of-order execution in-order retire microprocessor, the method comprising:
predicting, by a branch predictor, the presence of branch instructions fetched from an instruction cache and generating information associated with the branch instructions;
deciding, by an instruction decoded, the fetched branch instructions;
storing the information associated with the branch instructions in a branch information table, the branch information table comprising a circular queue of N entries allocated in program order in response to the instruction decoder decoding the branch instructions, wherein each of the N entries is configured to store the information associated with one of the branch instructions, wherein the allocate entry is de-allocated after execution of the branch instruction; and
storing information associated with an unretired instruction within the microprocessor in a reorder buffer, the reorder buffer comprising M entries, wherein each of the M entries includes a field that indicates whether the unretired instruction is a branch instruction and, if so, a tag identifying one of the N entries in the branch information table storing the information associated with the branch instruction;
wherein N is less than M.

18. The method of claim 17, further comprising:
updating branch prediction information of the branch predictor based on the branch information stored in the branch information table.

19. The method of claim 17, further comprising:
executing a branch instruction using the branch information stored in the branch information table associated with the branch instruction, wherein the information associated with the branch instruction stored in each of the N entries of the branch information table comprises a predicted target address of the branch instruction, wherein said executing the branch instruction comprises obtaining the predicted target address using the tag from the reorder buffer entry associated with the branch instruction and comparing the predicted target address with a correct target address to determine whether the branch predictor mispredicted the target address of the branch instruction.

20. The method of claim 17, wherein the information associated with the branch instruction stored in each of the N entries of the branch information table comprises indications of whether a fetch address from which the branch instruction was fetched hit in a branch target address cache of the microprocessor.

21. The method of claim 17, further comprising:
allocating one of the M entries of the reorder buffer and populating the tag of the allocated one of the M entries to identify the one of the N entries of the branch information table allocated for the branch instruction.

22. The method of claim 17, further comprising:
stalling instruction fetching by the microprocessor in response to failing to allocate one of the N entries of the branch information table.

23. The method of claim 17, wherein N is less than approximately half of M.

24. The method of claim 17, wherein the information associated with the branch instruction stored in each of the N entries of the branch information table comprises a predicted target address of the branch instruction.

25. The method of claim 17, wherein the information associated with the branch instruction stored in each of the N entries of the branch information table comprises a global branch pattern used in a gshare predictor.

26. The method of claim 17, wherein the information associated with the branch instruction stored in each of the N entries of the branch information table comprises a fetch address from which the branch instruction was fetched.

* * * * *